United States Patent Office 2,737,747
Patented Mar. 13, 1956

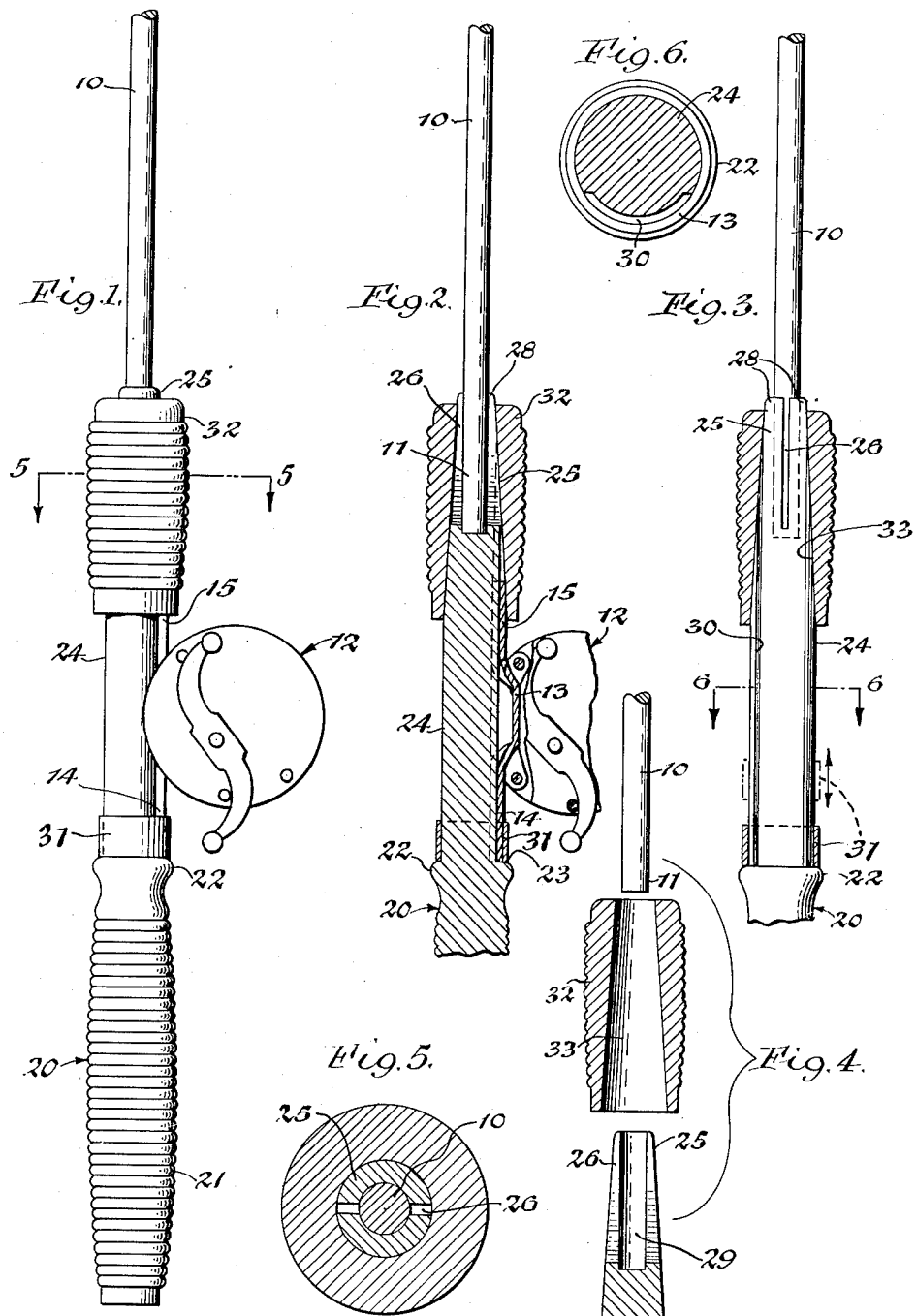

2,737,747

HANDLE FOR FISHING POLES

George O. Benson, Youngstown, and John V. Maglio, Niagara Falls, N. Y., assignors to Chisholm-Ryder Co., Inc., Niagara Falls, N. Y., a corporation of New York Application November 18, 1953, Serial No. 392,809

1 Claim. (Cl. 43—22)

This invention relates to a handle for fishing rods and more particularly to such a handle which removably carries both the blade or tip and also the reel of the fishing rod.

One of the principal objects of the present invention is to provide an extremely simple and low cost handle for fishing rods in which the movement of one part of the handle serves both to secure the blade or tip to the handle and also to secure the reel to the handle.

Another object is to provide such a handle and securing part both of which can be made of wood although the invention is not limited to the use of wood inasmuch as molded plastics or metal could be substituted for wood.

Another aim is to provide such a low cost handle in which both the blade or tip and the reel are reliably secured and are not likely to be accidentally released.

Another object is to eliminate such special metal parts as are usually employed with handles of this character such as ferrules, threaded collets, and knurled caps.

Other objects and advantages of the invention will be apparent from the following description and drawings in which:

Fig. 1 is a side elevational view of a handle for the blade and reel of a fishing rod, the parts being in operative or assembled position with the blade or tip and the reel of the fishing pole secured to the handle.

Fig. 2 is a fragmentary longitudinal sectional view through the handle and associated parts as shown in Fig. 1.

Fig. 3 is a view similar to Fig. 2, with the locking member moved to a position to release the blade or tip and also the reel.

Fig. 4 is a fragmentary view similar to Fig. 2 with the parts in exploded relation to one another.

Fig. 5 is an enlarged transverse sectional view taken on line 5—5, Fig. 1.

Fig. 6 is an enlarged transverse sectional view taken on line 6—6, Fig. 3.

The handle forming the subject of the present invention is designed to support a fishing blade or tip 10 which can be made of metal or glass and is shown as being in the form of a tapered solid shaft, the butt end 11 of which is inserted into, gripped, and securely held by the handle until deliberately released. On the handle is also releasably mounted a conventional fishing reel 12, this fishing reel having a mounting plate 13 which includes oppositely projecting relatively narrow ends 14, 15 of concavo-convex form in cross section with the convex side facing the rotor of the reel.

The handle, indicated generally at 20, is shown as being made of wood, although obviously it could be made of other materials, wood being preferred because of its low cost and the ease with which the handle can be made on conventional wood working machinery from wood. The handle is shown as comprising a grip 21 of enlarged diameter and preferably circularly grooved and of enlarging diameter toward its center as shown. This grip is shown as terminating in an annular radially projecting bead 22 which forms an axially facing annular shoulder 23 from which a generally cylindrical extension 24 of the handle projects. This generally cylindrical extension terminates in a tapered end 25 of frusto-conical form diminishing toward the corresponding end extremity of the handle and this tapered end 25 is also longitudinally slotted, as indicated at 26, to provide a pair of fingers or bifurcations 28, 28 capable of being moved toward each other to grip the butt end 11 of the fishing blade or tip 10. For this purpose the tapered end 25 is also provided with a coaxial blind bore 29 extending from the end extremity of the tapered end 25 and of a size to receive snugly the butt end 11 of the blade or tip 10.

The generally cylindrical extension 24 is provided with an external longitudinal groove 30 which is shaped to receive the projecting ends 14, 15 of the mounting plate for the reel 12, the groove 30 being preferably slightly shallower than the corresponding thickness of the ends 14, 15 so that these ends project very slightly radially from this groove. This groove extends into the tapered end 25 and since its bottom is parallel with the axis of the handle, the end of the groove 30 in the tapered end 25 merges into this tapered end and is of diminishing tapered form.

The end 14 of the mounting plate 13 for the reel is yieldingly held in the groove 30 by a ring or band 31 of metal which embraces the cylindrical extension 24. The opposite end 15 of the mounting plate for the reel is yieldingly held in the groove 30 by a sleeve 32 which is also preferably made of wood. The exterior of this sleeve 32 can be grooved to conform to the grip 21 and this sleeve is provided with an internal tapered through bore 33 having a slightly greater degree of taper than the tapered end 25 of the handle and of such size that when fitted over the tapered end 25 and forced toward the grip 21 the bifurcations 28, 28 are forced toward each other into compressive or clamping relation with the blade or tip 10 to firmly secure the blade or tip to the handle.

In use, assuming that it is desired to attach the blade or tip 10 and the reel 12 to the handle 20, the user first places the metal band or ring 31 over the generally cylindrical extension 24 of the handle and slides it lengthwise of this extension into engagement with the shoulder 23 provided by the bead 22. He then inserts the tip 10 with the sleeve 32 arranged thereon. The user then places the mounting plate 13 of the reel in the groove 30 so that the end 14 thereof projects toward the grip 21. The reel is then slid lengthwise of the handle to project the extremity of the end 14 under the band or ring 31 as shown in Fig. 2.

The sleeve 32 is then fitted over the tapered end 25 of the handle and so that its tapered bore 33 is loosely engaged with this tapered end. This sleeve 32 is then forced toward the grip 21 with sufficient force to contract the fingers or bifurcations 28 toward each other and into compressive relation with the butt 11 of the blade or tip 10. At the same time this forces the large bore end of this sleeve over the end 15 of the mounting plate for the reel and into compressive relation with this end 15 so as to fasten securely the reel to the handle. The reel 12 and blade or tip 10 can, of course, be detached from the handle by freeing the sleeve 32 from the tapered end 25 to release both the fingers or bifurcations 28 as well as the end 15 of the mounting plate for the reel.

From the foregoing it will be seen that the present invention provides a very simple and extremely low cost handle for a fishing rod in which the simple manipulation of one part serves both to secure the blade or tip as well as the reel and to reliably hold these parts in assembled relation until intentionally released.

We claim:

A handle for the blade and reel of a fishing rod and which reel includes a mounting plate having oppositely projecting ends, said handle comprising a one piece grip having a generally cylindrical integral extension of reduced diameter terminating in an integral tapered frusto-conical end the taper of which end diminishes away from said grip, said ends of said mounting plate fitting said generally cylindrical extension with one end thereof adjacent said grip and the other end thereof adjacent said frusto-conical end, a ring slidably mounted on said cylindrical portion into and out of abutting relation with said grip and arranged to embrace and releasably secure said one end of said mounting plate to said generally cylindrical extension, said frusto-conical end being axially slotted from one side thereof to the other to provide axially projecting fingers and said frusto-conical end also being provided with an axial bore extending from the end opposite said grip and into which one end of said blade is snugly fitted, and a sleeve having a tapered bore arranged when forced over said frusto-conical end to contract said fingers into compressive relation with said blade and also to engage and hold said other end of said mounting plate against said generally cylindrical extension.

References Cited in the file of this patent

UNITED STATES PATENTS

| | | |
|---|---|---|
| 841,761 | Bartlett | Jan. 22, 1907 |
| 1,965,796 | Dunkelberger | July 10, 1934 |
| 2,166,407 | Howarth | July 18, 1939 |

FOREIGN PATENTS

| | | |
|---|---|---|
| 21,335 | Great Britain | 1909 |
| 120,030 | Sweden | Aug. 21, 1947 |